(12) United States Patent
Cooper

(10) Patent No.: US 6,696,933 B2
(45) Date of Patent: *Feb. 24, 2004

(54) AIR BAG SYSTEM WITH BIOMECHANICAL GRAY ZONES

(75) Inventor: John Cooper, Oxford, MI (US)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/238,668

(22) Filed: Sep. 10, 2002

(65) Prior Publication Data

US 2003/0018421 A1 Jan. 23, 2003

Related U.S. Application Data

(63) Continuation of application No. 09/578,822, filed on May 24, 2000, now Pat. No. 6,448,890.
(60) Provisional application No. 60/201,044, filed on May 1, 2000.

(51) Int. Cl.[7] .................................................. B60Q 1/00
(52) U.S. Cl. ...................... 340/438; 340/665; 340/436; 280/734; 180/273; 180/274

(58) Field of Search ................................. 340/438, 436, 340/665, 667, 666; 280/734, 735; 180/273, 274; 307/10.1, 9.1, 101; 701/45, 47

(56) References Cited

U.S. PATENT DOCUMENTS 5,964,478 A * 10/1999 Stanley et al. ............... 280/735
6,448,890 B1 * 9/2002 Cooper ........................ 340/438

* cited by examiner

Primary Examiner—Anh V La
(74) Attorney, Agent, or Firm—Markell Seitzman

(57) ABSTRACT

The implementation of dual-stage inflators in some production vehicles is quickly becoming a common reality. A dual-stage inflator has two firing squibs that can fire independently, simultaneously or in a delayed mode. This tailorability provides the ability to fire a low level, high level or staged delay level depending on the impact velocity or other means. For each restraint condition, the inflator output threshold speeds are identified. A biomechanical gray zone, for each injury assessment reference value, is defined based on occupant performance. The upper and lower bound of each biomechanical gray zone is associated with a type of occupant, inflator output, belt restraint and injury parameter.

18 Claims, 16 Drawing Sheets

Fig. 14 - Biomechanical Gray Zones

AIR BAG SYSTEM WITH BIOMECHANICAL GRAY ZONES

This application is a continuation of application Ser. No. 09/578,822, filed May 24, 2000, now U.S. Pat. No. 6,448,890.

This is a regularly filed utility patent application claiming priority of provisional patent application 60/201,044, filed May 1, 2000.

BACKGROUND AND SUMMARY OF THE INVENTION

This invention generally relates to motor vehicle safety restraint systems. More particularly, the invention relates to a safety restraints system having biomechanical gray zones, which defines the response of the restraint system depending on changes in velocity and occupant response.

Recent legislative changes have significantly increased the complexity of the required safety systems. These new requirements cover not only midsize adults but also small females and children. Advances in inflator technologies allow for the use of multilevel output air bag inflators. While these new inflators significantly improve occupant safety over a wide range of crash conditions, they also greatly increase the complexity of a systems design and performance.

In analyzing air bag system performance, it is useful to divide the system into three discrete regimes: 1. Information: acquiring information about crashes and occupants, 2. Analysis/Decision: analyzing that information to determine the nature of the crash and the circumstances of the front seat occupants, and deciding how to adjust the response of the air bag system accordingly, and 3. Response: adjusting the performance of the air bag (i.e. inflator) in response to the decisions regarding the acquired information.

Air bag systems acquire information through the use of sensors. All air bag systems have some kind of crash sensor indicating the occurrence of a crash and its severity. These systems process information from the sensors and use an algorithm to make decisions on the desired air bag deployment and performance based on predictions about the crash event. The systems may also have sensors, which provide information about such things as belt use, child seat use, occupant weight and size, seat adjustment position, and occupant location. The information from the sensors is used by the electronic control unit in making decisions as to whether and when the air bag is to be deployed. Air bag systems using these advanced technologies use the information to tailor the inflation levels of multi-stage air bags.

The information, analysis/decision, and response aspects of air bag systems each offer opportunities for improving occupant protection. With more and better information, improved decision-making algorithms, and greater adjustment capability to tailor the inflation, an air bag system can be designed to provide an improved response.

For example, with improved information about crash severity, the deploy/don't deploy decision can be made earlier in a crash. By deploying earlier during a crash, before the occupant has moved very far forward, the air bag can better protect the occupant and is less likely to pose risks to the occupant. If an air bag system includes sensors, which provide information about occupant weight and/or size or location, it can be designed to suppress deployment in the presence of a young child or to deploy differently for small adults and large adults (e.g., a lower level of inflation for a smaller adult than that for a larger one). Critical to these advanced systems is the ability to deploy multilevel inflators at various levels depending on crash scenarios. The region where it is acceptable to deploy either low or high level outputs is the biomechanical gray zone.

Simulation studies using specific vehicle models and crash situations are used to define the biological gray zones. Impact velocity and restraint conditions are analyzed using occupant simulation models. In the example case, only in-position mid-seated $50^{th}\%$ (fiftieth percentile) occupant performance has been investigated; it is of course envisioned that the development of an actual restraint system with biological gray zones would include occupants of various sizes.

In view of the aforementioned challenges and design considerations, it is an object of the current invention to provide an air bag restraint system which will assess the difference in desired high and low level inflator output threshold speeds for belted and unbelted occupants.

It is further an object of the current invention to independently assess the high and low level inflator output threshold speeds for driver and passenger.

It is further an object of the current invention to identify the biomechanical gray zones for each type of occupant, inflator output and belt restraint.

It is further an object of the current invention to generate fire and no-fire diagrams.

It is further an object of the current invention to identify if the restraint system meets the occupant performance goals.

BRIEF DESCRIPTION DRAWINGS

Still other advantages of the present invention will become apparent to those skilled in the art after reading the following specification and by reference to the drawings in which.

DESCRIPTION OF THE PREFERRED EMBODIMENT

The following description of the preferred embodiment concerning a safety restraint system is exemplary in nature and is not intended to limit the invention or its application or uses. Moreover, while the present invention is described in detail below generally with respect to a vehicle safety restraint system for forward crashes, it will be appreciated by those skilled in the art that the invention is clearly not limited to forward sensed crashes and may be applied to various other crash scenarios such as side impact or rollover, as further discussed herein.

Figure 1:
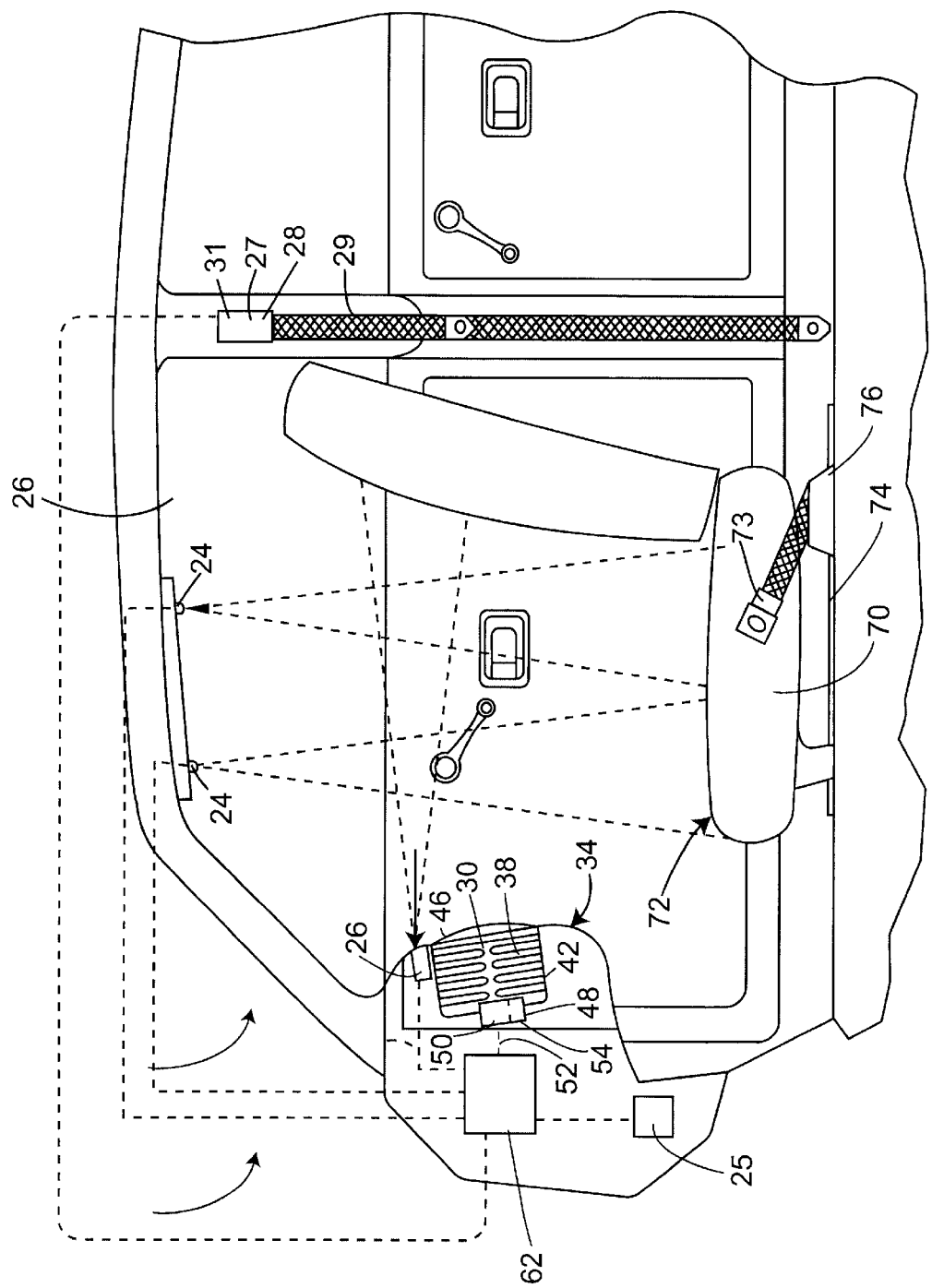
FIG. 1 is a side view of the automotive safety restraint system according to the teachings of the preferred embodiment of the present invention.

FIG. 1 shows a side view of a typical vehicle passenger compartment 26 having a plurality of sensing apparatus in accordance with a preferred embodiment of the present invention that will be used to control the operating characteristics of the vehicle's safety restraint system. The vehicle safety restraint system includes a retractor 27 about which a seat belt 29 is wound, pretensioner or belt tightener 28 associated with either the retractor or buckle, and pretensioner squib 31 (which activates the pretensioner) for seat belt 29 control, and an air bag assembly 30 mounted in a dashboard or instrument panel 34 (or steering wheel or side of the vehicle or vehicle seat) of the compartment 26.

The advanced air bag system uses various types of sensors (25, 24) to obtain information about crashes, vehicles and their occupants. This information can be used to adapt the performance of the air bag to the particular circumstances of the crash. As noted above, it can be used in determining whether an air bag (30) should deploy, when it should deploy, and (if it has multiple inflation levels) at what level of inflation (pressure rise) and inflation rate (pressure rise rate).

Crash severity sensors (25) measure the severity of a crash; i.e., the rate of reduction in velocity when a vehicle strikes another object. If a relatively low severity crash is sensed, only the low-level stage of a dual-stage inflator will fill the air bag; if a moderate severity crash is sensed, the low and high-level stages will fill the air bag with a specific time delay between the two stages; and if a more severe crash is sensed, both stages will fill the air bag either simultaneously or with a very small delay (5–10 msec) interval between the stages.

Information from crash severity sensors in conjunction with seat belt use sensors are used to select the appropriate crash severity threshold levels for belted and unbelted occupants. For instance, multiple speed thresholds for deploying air bags are envisioned and it is the setting of these threshold speeds which is the subject of this invention. For example, a vehicle can have a lower threshold for air bag deployment at approximately 19 km/h (12 mph) when an occupant is unbelted and a higher threshold of approximately 29 km/h (18 mph) is utilized when the an occupant is belted. A belt buckle switch provides the information to allow the selection between these two thresholds.

The air bag assembly 30 has an air bag 38 that is folded and stored within the interior of an air bag housing 42. A deployment door 46 covers the air bag 38 and is configured to open upon inflation of the air bag 38. The door 46 can be part of the instrument panel or separate therefrom.

An inflator 50 having a first gas source 52 and second gas source 54 is mounted at the back of the housing 42 and operatively connected to the air bag 38. Gas from the first and/or second gas source 48,50 is provided to the air bag 38 such that the air bag 38 is filled to an inflated condition. Once inflated in response to an impact event, the air bag 38 cushions an occupant positioned in the passenger compartment 26.

The gas sources 52, 54 typically have electrically actuated igniters, referred to as squibs. A first squib 48 and second squib 50, when activated, actuate the first and/or second gas sources 52, 54 to produce or release inflation gas. The squibs 52,54 may be singularly activated, simultaneously activated, or activated in staged sequence to control the rate or degree of air bag 38 deployment as desired.

In addition to using crash severity and seat belt 29 use information for dual threshold strategies, this information is also utilized to employ different inflation levels for belted and unbelted occupants through the use of the multi-stage air bag inflator. For instance, a belted occupant may only need a low-powered inflation level, since the seat belts also provide restraint, while an unbelted occupant may require a full-powered air bag to provide a timely inflation and full protection by the air bag. Similarly, the crash severity information may be used with a multi-stage inflator to employ a low level of air bag inflation in a low-severity crash or full-power inflation in a high-severity crash, in which additional restraint is needed for occupant protection.

The squibs 52,54, vent valve 58, retractor 27 and/or buckle pretensioner 28 (via the pretensioner squib 31) are electrically activated by a controller 62, such as a microcomputer, when a crash event is sensed. The controller 62 provides the necessary signals such that the appropriate dynamic inflation profile of the air bag is produced and the seat belt action is tuned for particular crash conditions and the presence and/or position of the vehicle occupant.

Additionally, other sensors are envisioned, which suppress the air bag in the presence of children to prevent undesirable deployments. To accomplish this, manufacturers are refining seat weight or seat pattern recognition systems for detecting passenger occupant size and/or position.

Weight sensing systems 70 estimate the weight of the occupant through various load cell technologies located in the seat cushion or at the base of the seat. The latter approach has the potential for avoiding the possible difficulties that can be created for seat-cushion 72 weight sensors when the seat back is tilted back enough to transfer a significant portion of the occupant's weight from the seat cushion to the seat back. The algorithms associated with these devices can be designed to take into consideration and minimize the effects of belt cinch forces (for example, from child safety seats) by using belt tension-measuring hardware to make an adjusted assessment of weight.

Other advanced occupant detection systems under development use technologies, such as capacitive, ultrasonic, and infrared, for sensing occupant size and/or location with respect to the air bag module. These are used in the development of dynamic and static suppression strategies.

Strategies for static occupant detection systems include the ability to make a determination of whether air bag 30 deployment is warranted (or what level of inflation is appropriate) for the size and/or position of the occupant (e.g., whether the occupant is a small child or a full-sized adult, or whether the occupant is against the seat back or is sitting on the edge of the seat, closer to the air bag). These technologies may be used in conjunction with seat weight sensing/pattern recognition systems (or seat belt use and crash severity sensing) to improve the reliability of the occupant classification and location estimates.

Dynamic suppression strategies using advanced technologies, such as capacitive, ultrasonic, and infrared 243, will be able to make dynamic assessments of when an occupant is out of position by determining the location of the occupant during the course of a crash. These technologies have rapid sensing capabilities and algorithms to make the air bag deployment or suppression decision, for example, in the event of pre-impact braking. These systems have the added benefit of protecting not only children, but also out-of-position adults.

The air bag systems link sensors that determine whether the occupant is using his or her seat belt and whether the occupant has positioned the vehicle seat along the seat track 74 (i.e., all or nearly all the way forward or farther back). The advanced air bag system using the crash severity sensors 25 and dual-stage inflators 50 use seat belt use information to adjust deployment thresholds or inflation levels depending on whether the occupant is belted or unbelted. Since an unbelted occupant is more susceptible than a belted occupant to injury in less severe crashes, the unbelted occupant needs the protection of an air bag at lower crash severities than a belted occupant does. Accordingly, the air bag would deploy at a lower threshold for an unbelted occupant.

Seat position sensors 76 determine how far forward or back a seat is adjusted on its seat track 74. The advanced air bag system 72 is designed so a dual-stage air bag 30 deploys at a lower level when the seat is all the way forward than it does when the seat 72 is farther back. This would benefit those short-statured drivers who move their seats all the way forward, or mid-to-tall-statured drivers who move their seats farther back.

The implementation of dual stage inflators 50 is essential for the use of the current invention. The tailorability of the output provides the ability to fire a low-level, high-level or staged-delay level depending on the impact velocity or other means. For the purpose of the following example, only the high and low-level outputs were considered. It is the definition of these firing thresholds that defines the biomechanical gray zones.

Because of the complexity of the system and system requirements, it is necessary to make a determination and system definition of the biomechanical gray zones by conducting a complex set of computer crash simulations. These simulations are used to determine under what circumstances the initiation of a restraint component will likely improve the overall occupant safety, as well as determine when there is an increase in the possibility of injury induced by actuation of the restraint component. An example of such a restraint simulation is defined below.

Figure 2:
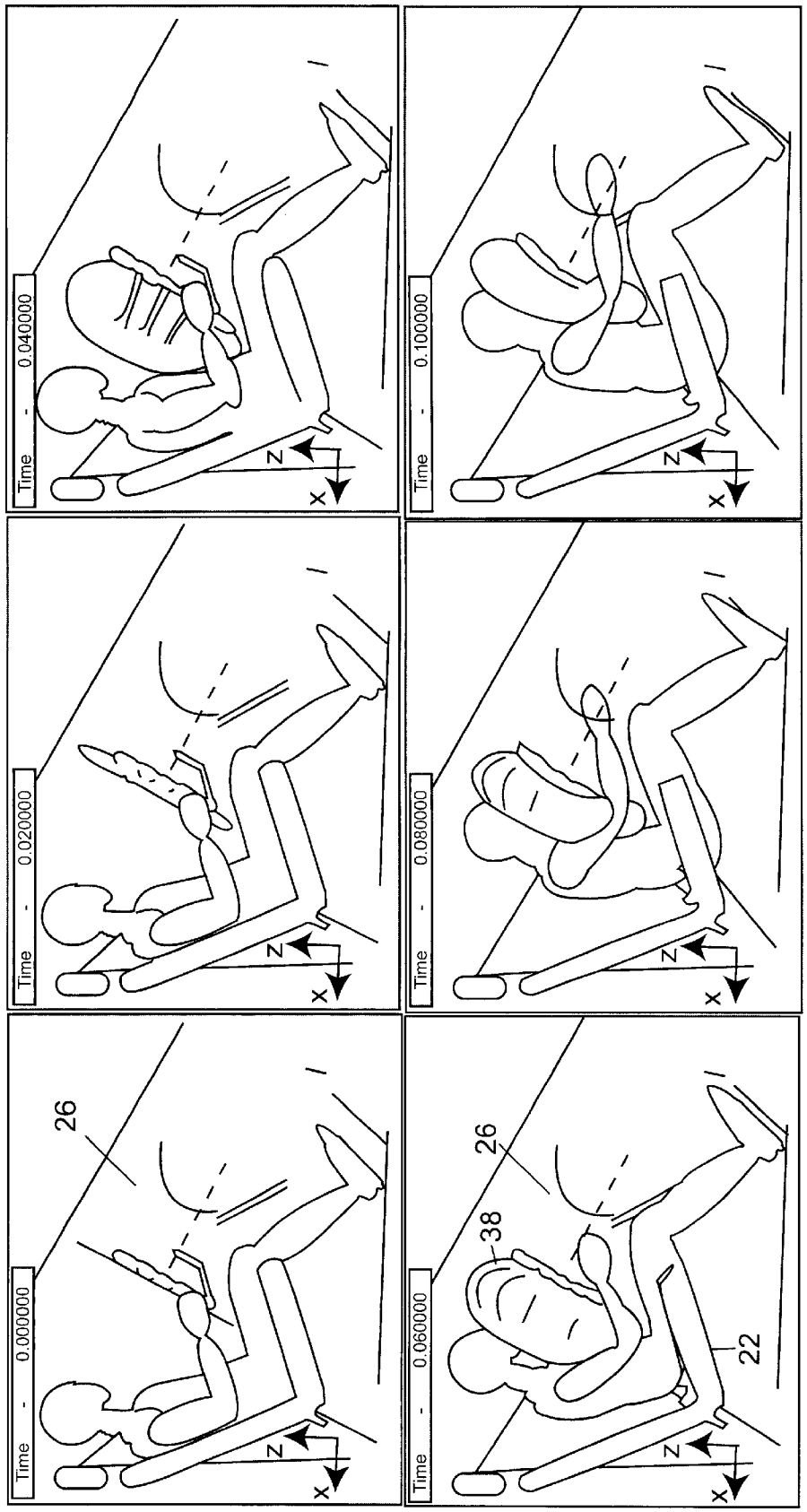
FIGS. 2 and 3 are screen shots from the computer model used to develop the preferred embodiment of the invention.
Figure 3:
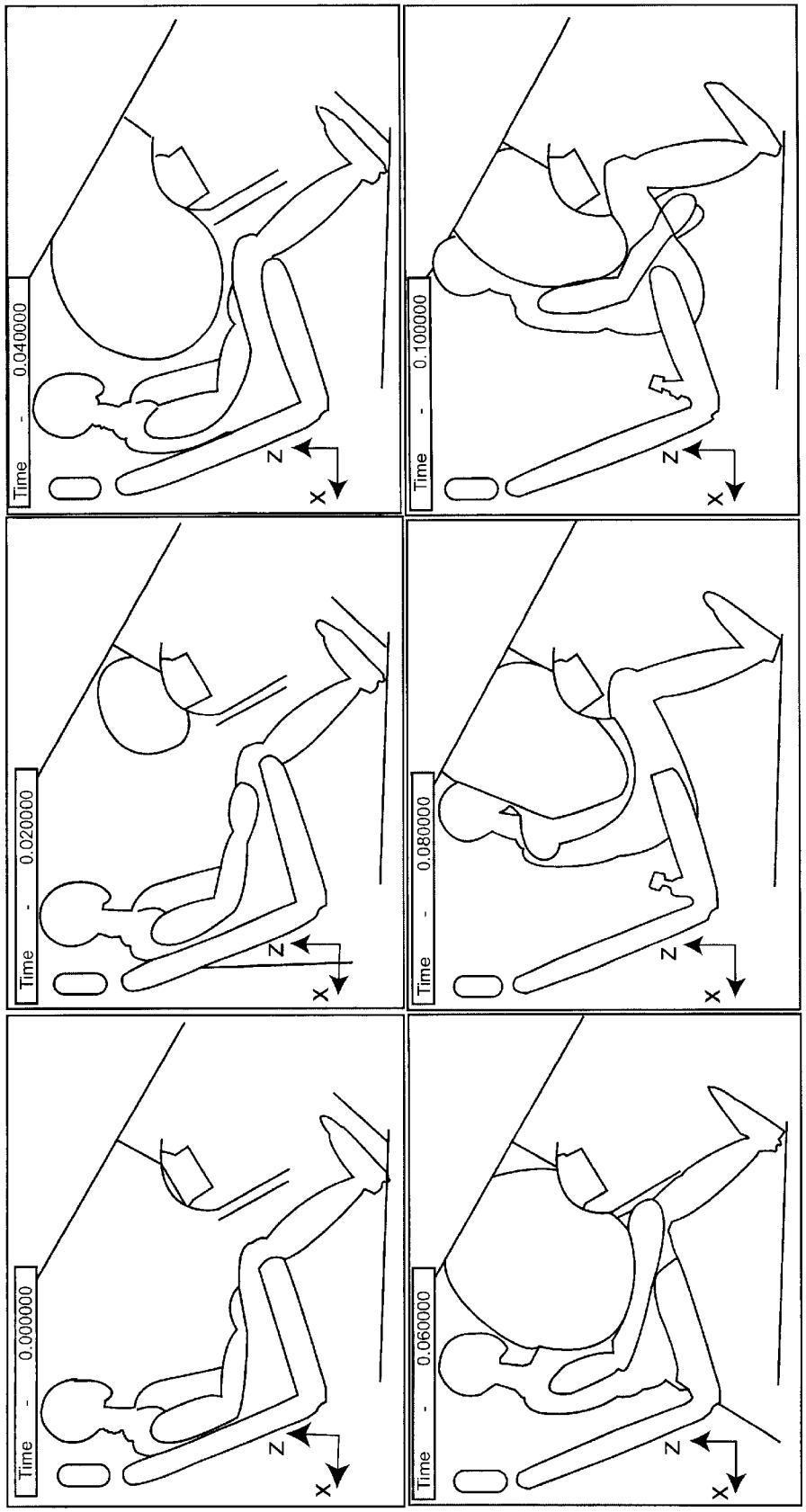

The following example shows how to define the biomechanical gray zones for a given restraint system. FIGS. 2 and 3 show the interior of a generic industry representative vehicle. Driver and passenger occupant simulation models were correlated against sled tests. FIGS. 2 and 3 show the belted driver and unbelted passenger kinematics. The Driver Air Bag (DAB) and Passenger Air Bag (PAB) simulator models were correlated with a physical dynamic drop-tower test to correlate air bag energy.

Crash pulses used in the simulation were generated from barrier tests of a unibody vehicle or scaled from these tests using known algorithms. Table 1 shows a list of pulses, their time to fire (TTF) and respective sources.

TABLE 1

| | Pulse Description | |
|---|---|---|
| Impact Velocity | TTF (ms) | Barrier/Scaled |
| 12 mph | 36.2 | Barrier |
| 16 mph | 26.0 | Barrier |
| 18 mph | 26.0 | Barrier |

TABLE 1-continued

| | Pulse Description | |
|---|---|---|
| Impact Velocity | TTF (ms) | Barrier/Scaled |
| 20 mph | 24.5 | Barrier |
| 22 mph | 23.5 | Barrier |
| 24 mph | 19.5 | Barrier |
| 26 mph | 15.5 | Scaled |
| 28 mph | 14.0 | Scaled |
| 30 mph | 15.0 | Barrier |
| 33 mph | 13.0 | Scaled |
| 35 mph | 13.0 | Barrier |

Figure 4:
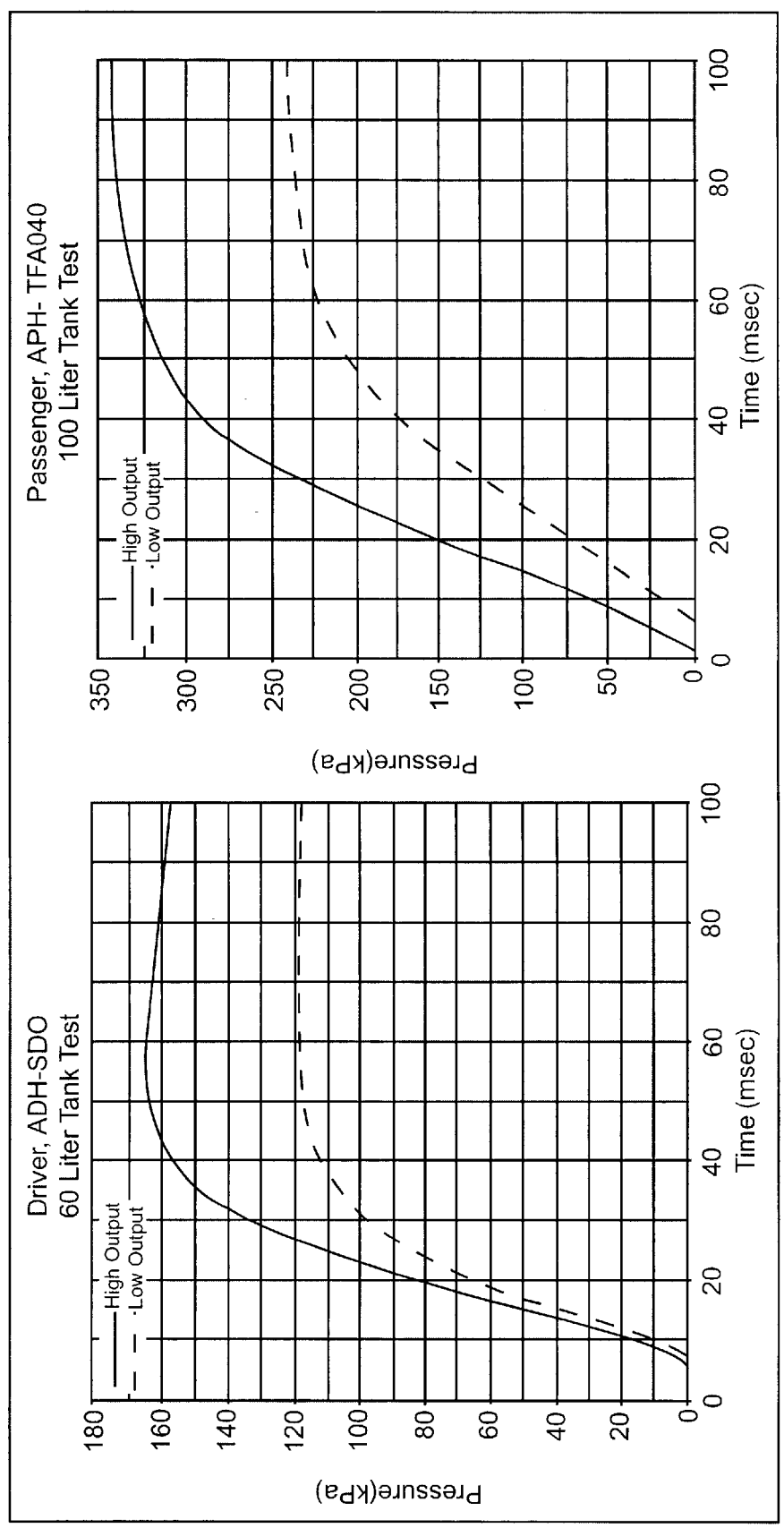
FIG. 4 is a graph representing output of the driver and passenger inflators at high and low levels.

The inflators 50 used for this study were the ARC Hybrid Dual Stage ADH-SDO and APH-TFA040 for the driver and passenger respectively. FIG. 4 shows the high-level and low-level tank pressure time history for the ADH-SDO and APH-TFA040 inflators.

Figure 5:
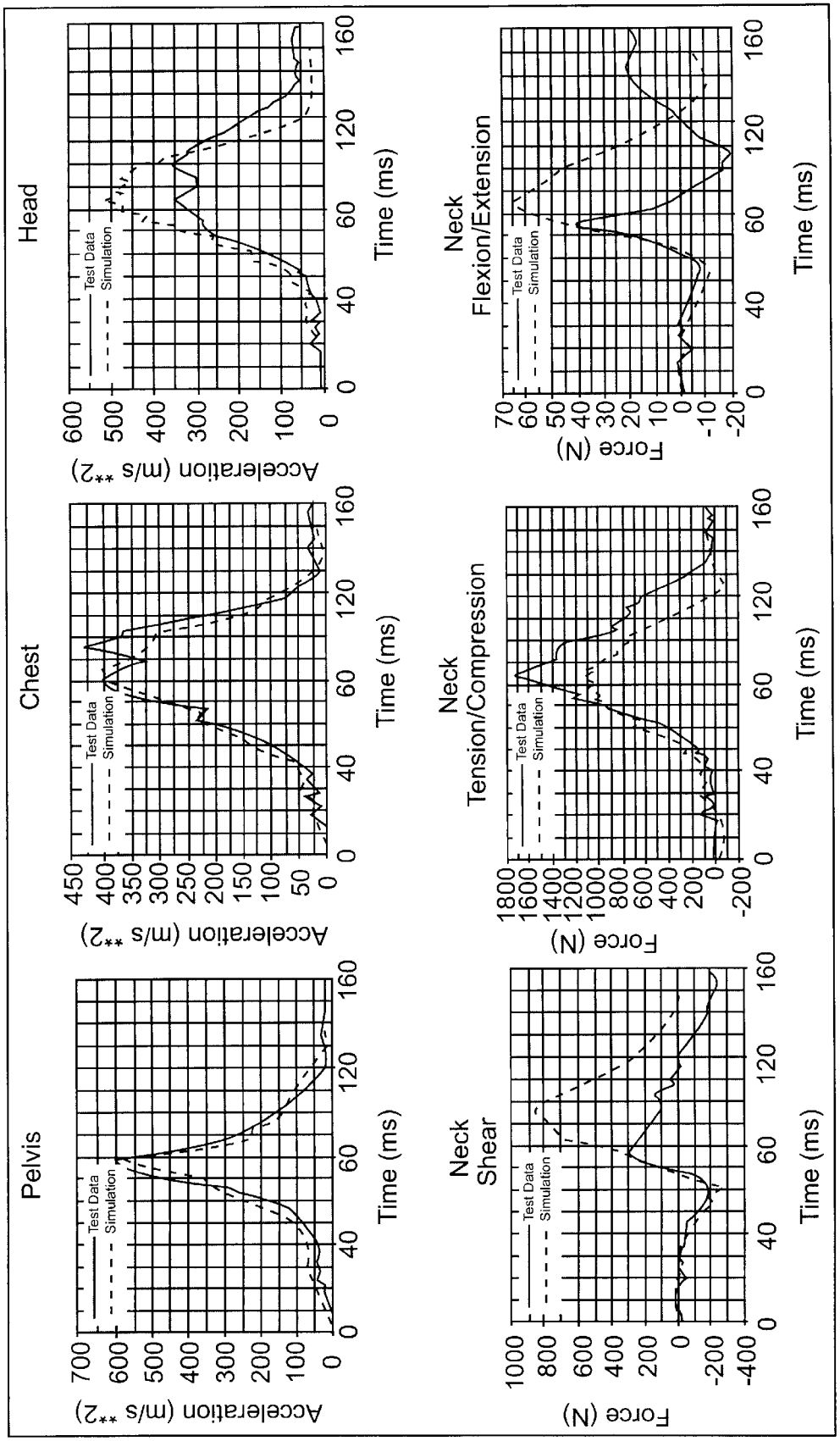
FIGS. 5–7 are plots showing correlation between the computer model's response and sled tests of belted and unbelted drivers and passengers.
Figure 6:
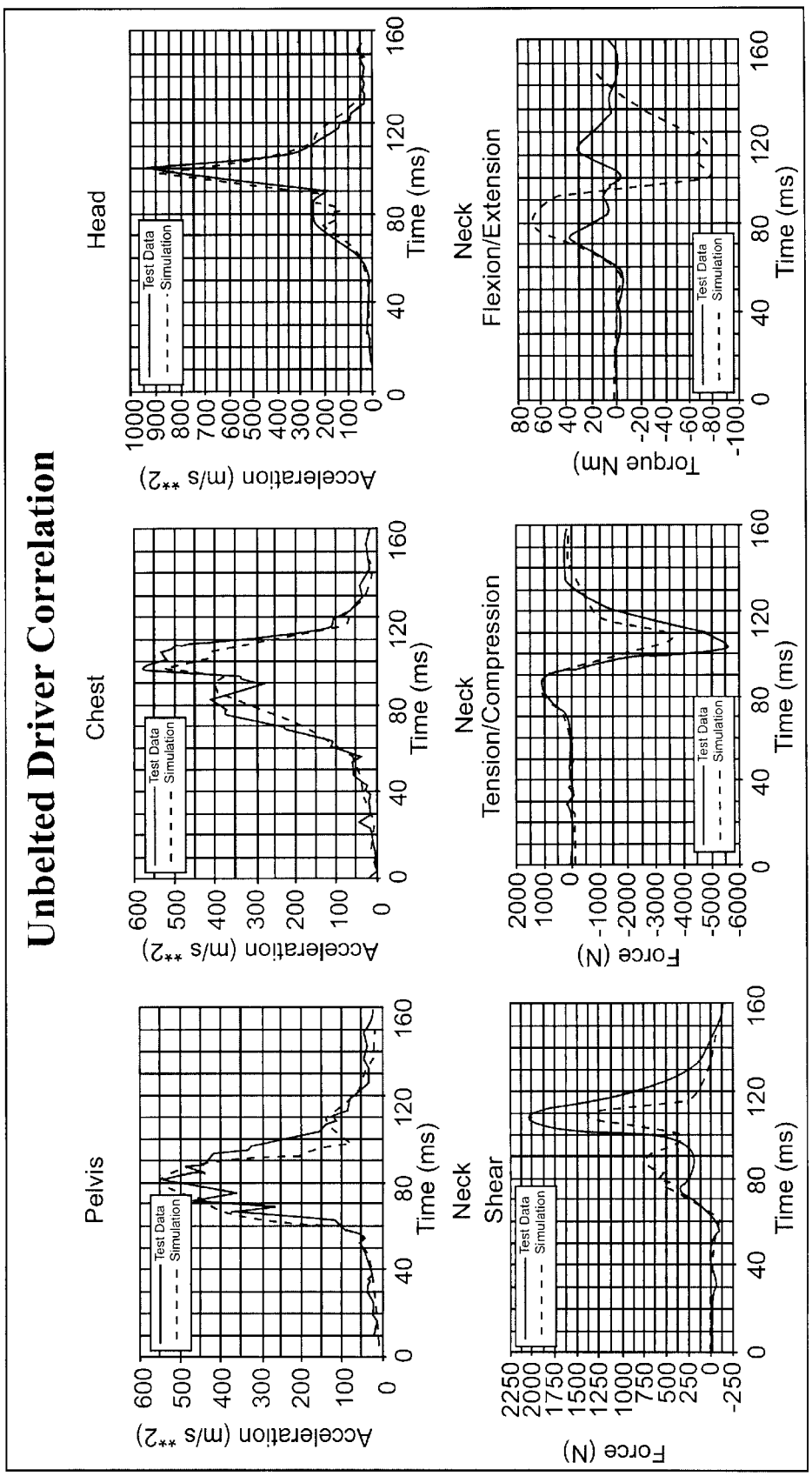
Figure 7:
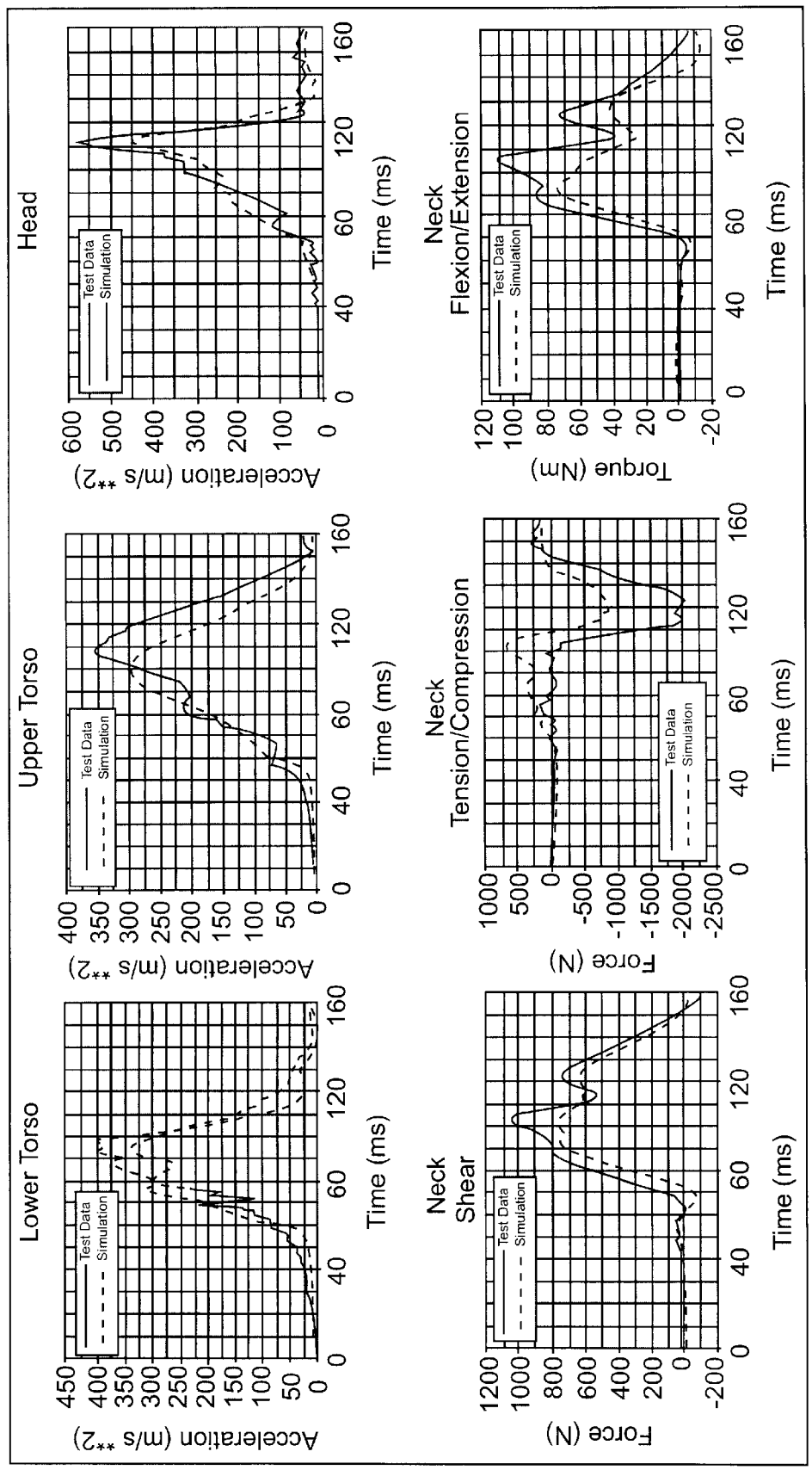

The generic model was originally correlated at a system and subsystem level. For the Driver interior model correlation, a 30-mph belted and unbelted configuration was used. FIGS. 5 and 6 show the driver correlation between the model and the sled test. The column stroke and steering wheel rim stiffness were correlated to drop-tower testing. The belted model correlation was performed in a belted-only sled test condition. For the Passenger interior model correlation, an AAMA unbelted configuration was used. FIG. 7 shows the passenger correlation.

A series of tank tests were performed at high and low-level outputs. These tests were performed for the driver inflator (ADH-SDO) and the passenger inflator (APH-TFA040). The tank test pressure time history was recorded then simulated in an occupant simulation virtual tank test. The correlated inflator outputs were then used in the air bag validation.

The dual-stage air bags were tested in a vertical drop-tower, where the drop-mass acceleration and bag pressure were recorded. This data was used to correlate the air bags, which were then input into the system level models.

By correlating the models at a subsystem level, a high degree of confidence was achieved with the models in their ability to predict trends in occupant performance. These models were then used in a full factorial DOE (designed experiments) with the following variables: impact velocity, inflator output and belt condition.

Biomechanical Gray Zone Definition

Figure 8:
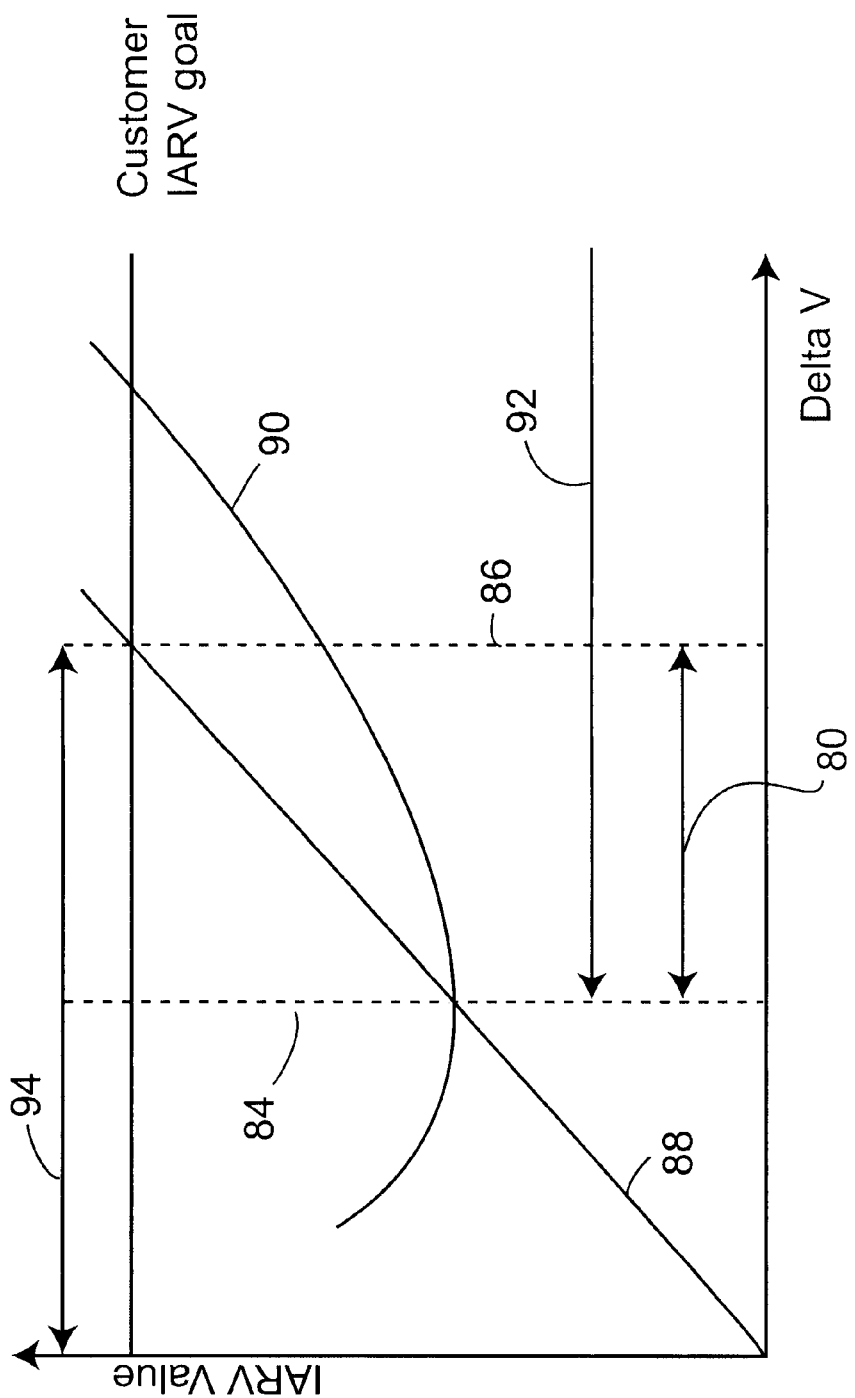
FIG. 8 shows a definition of the biomechanical gray zones.
Figure 9:
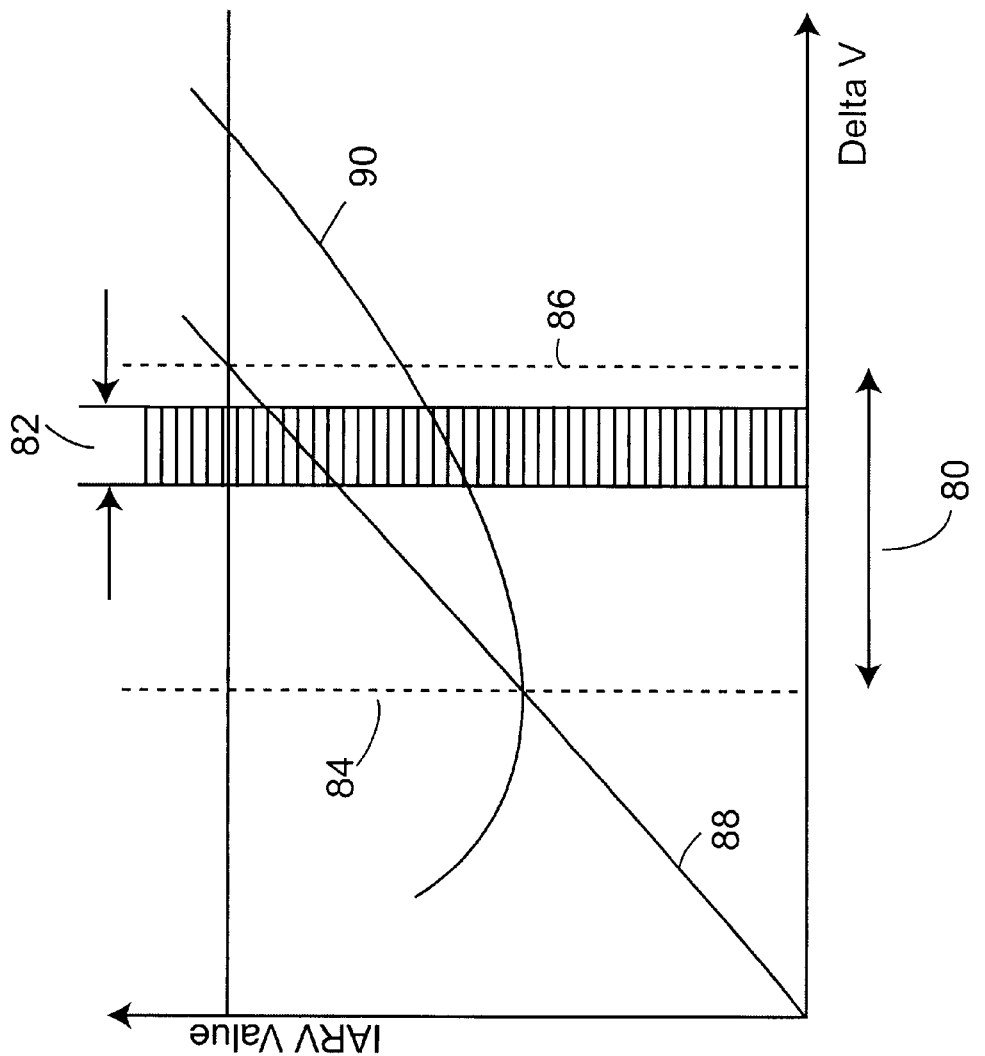
FIG. 9 shows the biomechanical gray zone with a sensors gray zone.

With the introduction of dual-stage air bags 30, the vehicle crash controller 62 sensing must decide when to fire a high-level 54 and low-level 52 inflator output. A must-fire threshold has to be generated for each stage of firing. Due to the nature of sensing systems and vehicle structures, there will be a sensing gray zone 80 where the system could fire either a low 52 or high-stage 54 and either a no-fire or fire-low stage. To ensure occupant safety, the restraint system must have an equivalent gray zone 80 that is equal to or larger than the sensing gray zone 82. The restraint system gray zone is referred to as the Biomechanical Gray Zone. FIG. 8 illustrates the inflator thresholds and biomechanical gray zones 80. FIG. 9 shows the relationship between the sensing and biomechanical gray zones 80. The use of biomechanical gray zones 80 is especially important for unbelted occupants.

In this example, the biomechanically based no-fire high-level inflator output threshold speed 84 is defined as the speed where the low-output inflator 52 produces higher in-position occupant performance values than the high-output inflator 54, but does not exceed the Injury Assessment Reference Value (IARV) goals. This defines when the high-output inflator may be fired. In some cases, it may be possible to set the no-fire high-level threshold speed at a lower or higher speed, since IARV goals are not exceeded.

The biomechanically based must-fire high-level inflator output threshold speed 86 is defined as the speed where the occupant performance with the low-level inflator output 52 exceeds the IARV goals. At this point the high-output inflator 84 must be fired. The velocity region between the no-fire high-level and must-fire high-level threshold speed is defined as the biomechanical gray zone 80.

Figure 14:
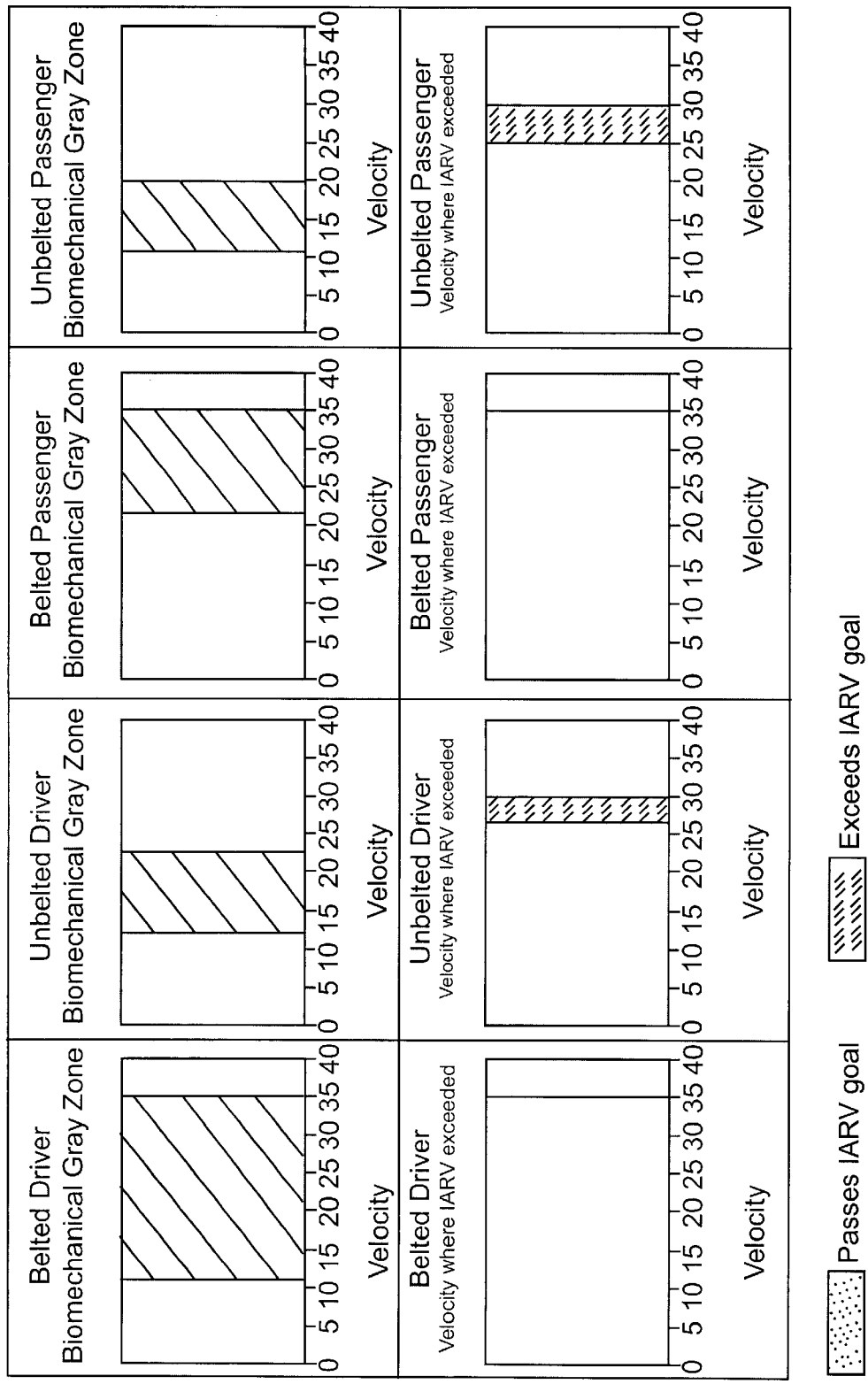
FIG. 14 shows the biomechanical gray zones.

Curve 88 is the performance curve of the system with a low-level output 52. Curve 90 represents the performances of a given IARV level with a high-output 54 inflator. Region 92 defines where a high-level output 54 gives better results for a given crash than a low-output 52 or no inflator. Region 94 defines where an occupant will see less than the IARV goal with a low-level 52 inflator. It must be noted that these zones are defined by each IARV level. The system's biomechanical zone is a combination of the zones 80, as seen in FIG. 14.

As seen in FIGS. 5–7 the occupant simulation model was over predicting the neck responses. For this reason these values are not used in defining the biomechanical gray zones in this simulation study. Further work is required to improve the neck correlation if the simulation is to be used to assess neck biomechanical gray zones.

For the purpose of this example, the IARV goals were normalized at 100% of the FMVSS 208 values 11 as defined in the National Highway Traffic Safety Administration, "Development of the Improved Injury Criteria for the Assessment of Advanced Automotive Restraint Systems" September, 1998. In practice, car manufactures tend to use values equal to or less than 80% of the regulated FMVSS value, to provide compliance margin. Table 2 shows the IARV goal for each injury value, as defined by NHTSA. As these values are subject to change by the government or automotive manufacturers, they are merely exemplary.

TABLE 2

| Injury Criteria | IARV's Limit |
|---|---|
| HIC (36 ms) | 1000 |
| Head g's (3 ms) | 80 g's |
| Chest g's (3 ms) | 60 g's |
| Chest Deflection | 76.2 mm |
| CTI | 1.0 |
| Neck Shear (+/−) | 3100 N |
| Neck Tension | 3300 N |
| Neck Compression | 4000 N |
| Neck Flexion | 190 N*m |
| Neck Extension | 57 N*m |
| $N_{ij}$ | 1.4 |

The following figures show the occupant performance values normalized with respect to each IARV goal for each inflator output as a function of impact velocity. The lower and upper bound of the biomechanical gray zone 80 is superimposed on each plot. This defines the biomechanical gray zone for each occupant performance value. Also, a plot of the minimum biomechanical gray zone 80, based on all occupant performance values, is shown.

Figure 10:
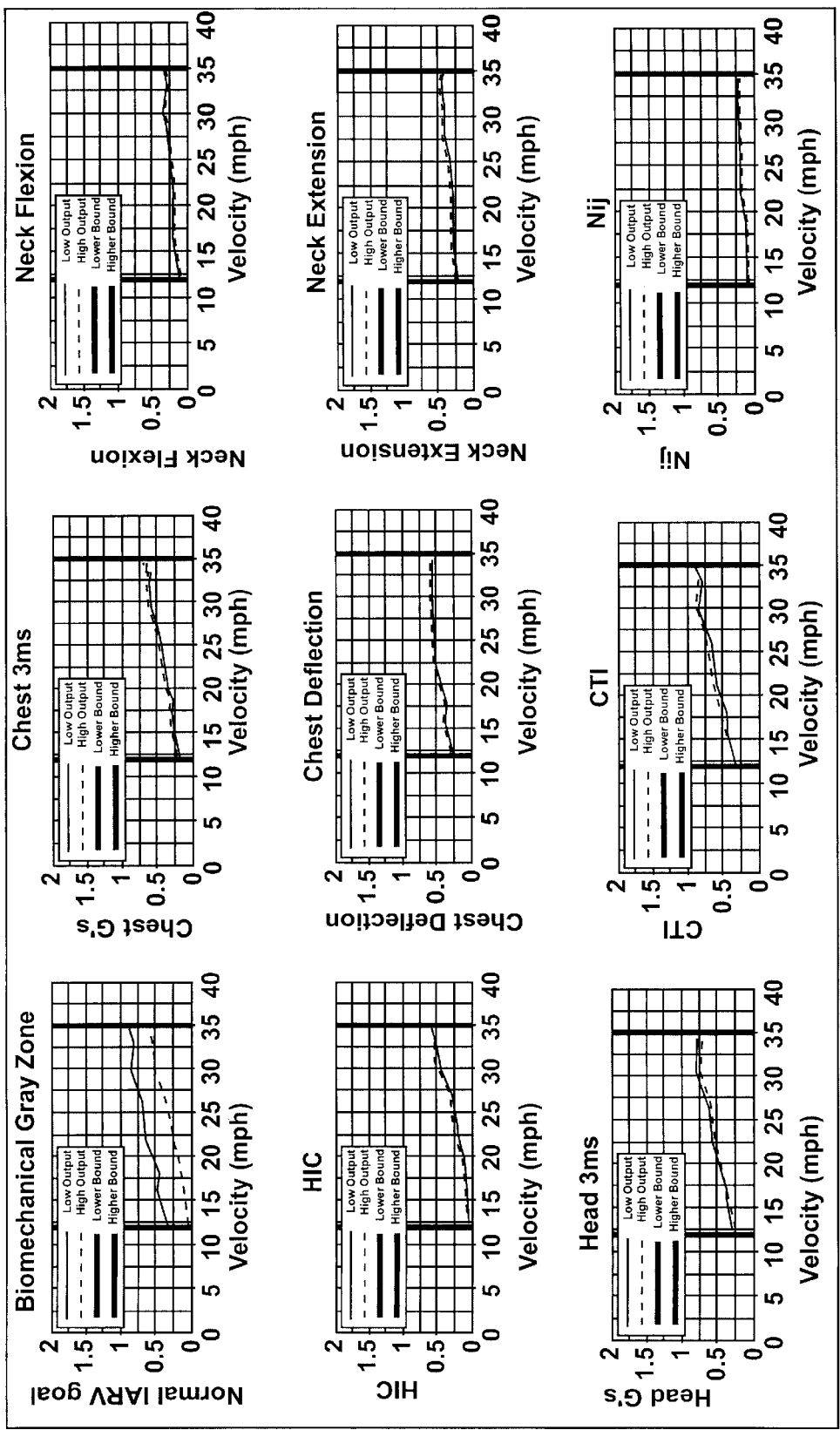
FIGS. 10 and 11 show an example driver's biomechanical gray zone.

FIG. 10 represents the results for a belted driver. The calculated occupant performance with low level does not cross over the calculated occupant performance with high level, so the low end of the biomechanical gray zone is set to the minimum velocity evaluated, 12 mph.

Occupant performance values with the low-level inflator output do not exceed the IARV goals for the velocity range evaluated, so the high end of the biomechanical gray zone was set to the maximum velocity evaluated, 35 mph.

Minimal occupant performance separation was observed with the high and low-output levels. This is attributed to the contribution of the seatbelt. The resulting biomechanical gray zone ranges from 12 mph to 35 mph.

Figure 11:
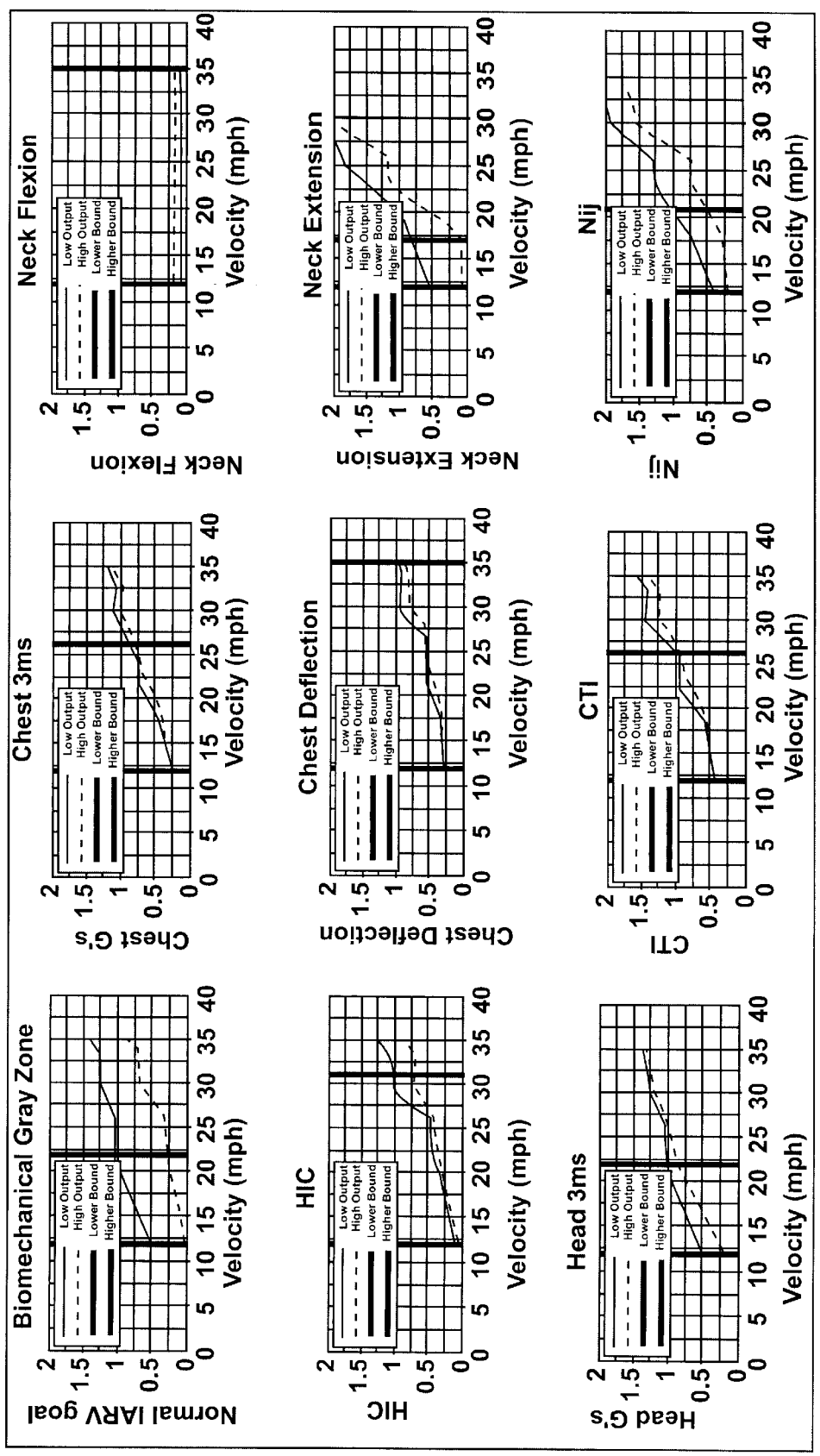

FIG. 11 represents the results for an unbelted driver. The calculated occupant performance with low level does not cross over the calculated occupant performance with high level, so the low end of the biomechanical gray zone is set to the minimum velocity evaluated, 12 mph. Head G's, with the low-level inflator output, exceed the IARV goal at 22 mph; this defines the high end of the biomechanical gray zone. Head G's, with the high-level inflator output, exceed the IARV goal at 27.5 mph; the desired velocity is greater than 30 mph and suggests a restraint system improvement is needed. The resulting biomechanical gray zone ranges from 12 mph to 22 mph.

Figure 12:
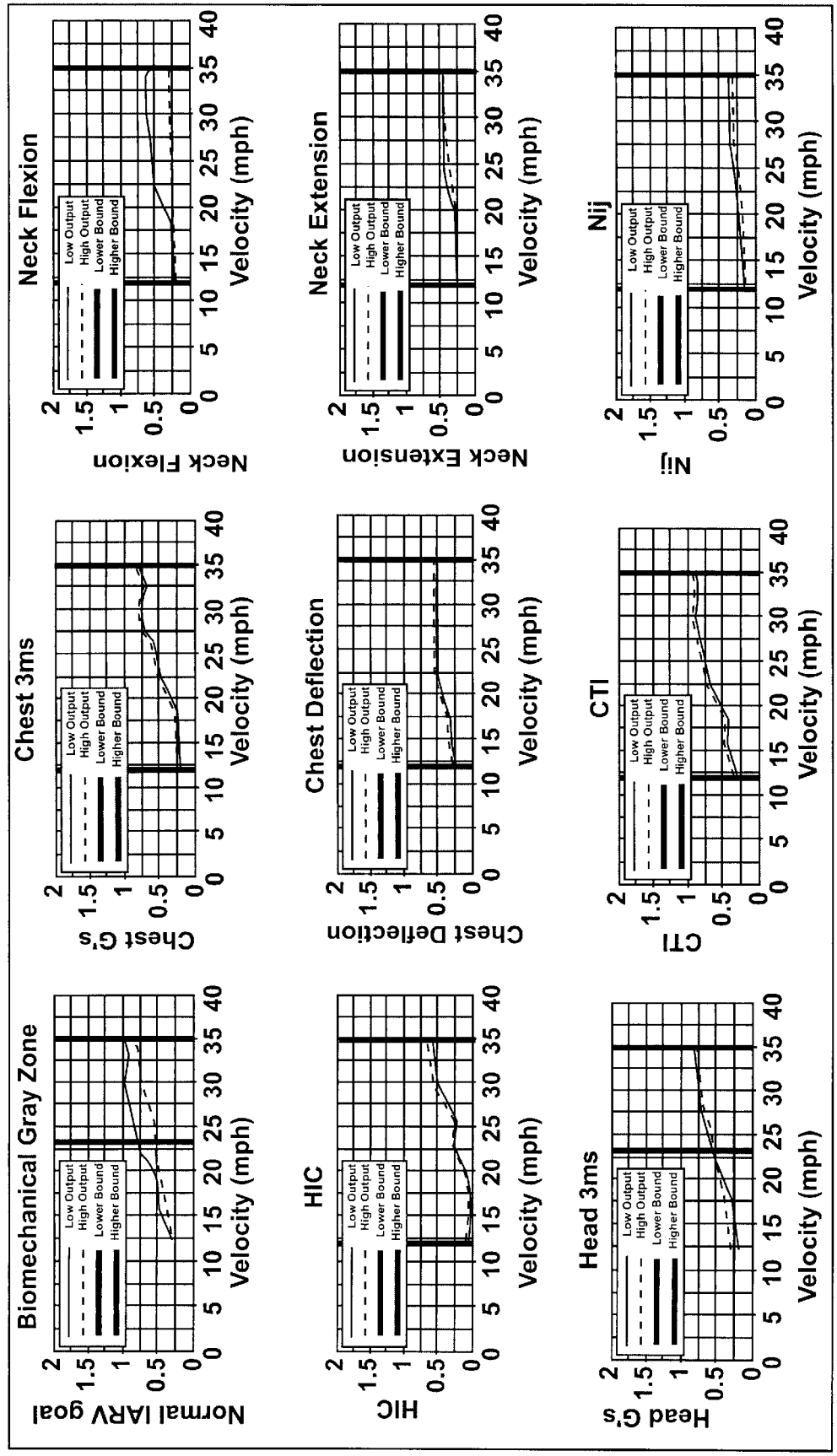
FIGS. 12 and 13 show an example passenger's biomechanical gray zone.

FIG. 12 represents the results for a belted passenger. The calculated head G's occupant performance with low level crosses over the calculated head G's occupant performance with high level at 23 mph; this defines the low end of the biomechanical gray zone.

Occupant performance values with the low-level inflator output do not exceed the IARV goals for the velocity range evaluated, so the high end of the biomechanical gray zone was set to the maximum velocity evaluated, 35 mph. Minimal occupant performance separation was observed with the high and low-output levels. This is attributed to the contribution of the seatbelt. The resulting biomechanical gray zone ranges from 23 mph to 35 mph.

Figure 13:
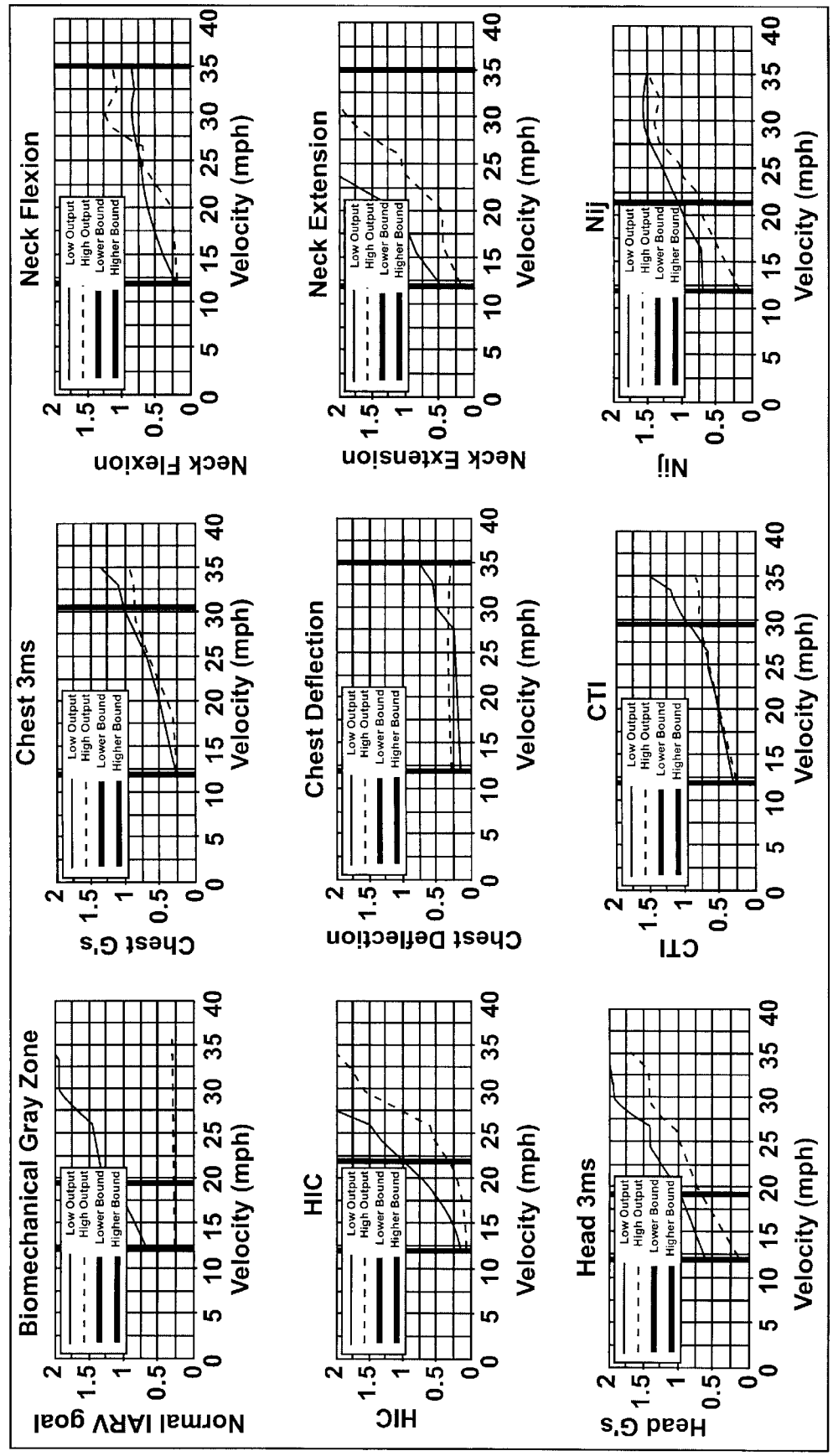

FIG. 13 represents the results for an unbelted passenger. The calculated chest deflection occupant performance with low level crosses over the calculated chest deflection occupant performance with high level at 28 mph, but there is minimal separation and the magnitude of the injury values are less than 30% of the IARV goal. The chest deflection cross-over point was ignored and the low end of the biomechanical gray zone can be set to the minimum velocity evaluated, 12 mph. Head G's, with the low level inflator output, exceed the IARV goal at 19 mph; this defines the high end of the biomechanical gray zone.

Head G's, with the high-level inflator output, exceed the IARV goal at 25.5 mph; the desired velocity is greater than 30 mph and suggests a restraint system improvement is needed. The resulting biomechanical gray zone ranges from 12 mph to 19.5 mph.

For each restraint condition, the biomechanical gray zone 80 for each IARV was calculated. The biomechanical gray zone 80 for each IARV was then overlaid to identify the smallest gray zone for each restraint condition. FIG. 14 shows the smallest gray zones produced from all the IARV's.

In addition, FIG. 14 shows the restraint performance with respect to the IARV goals. The occupant performance values should not exceed the IARV goals at a velocity less than 30 mph for an unbelted occupant and 35 mph for a belted occupant.

Belted Driver Biomechanical Gray Zone

The biomechanical gray zone spans the entire velocity range evaluated suggesting further studies outside the velocity range considered may be desired before the actual limits of the biomechanical gray zone can be defined. The IARV goals are met at all speeds assessed.

Unbelted Driver Biomechanical Gray Zone

The low end of the biomechanical gray zone is defined by the lowest impact velocity evaluated, not the cross-over of the low and high-level inflator output occupant response curves. This may require further study below the given velocity range. Head G's controls the high end of the biomechanical gray zone. The head G's exceeded the IARV goals at a velocity below the desired maximum speed.

Belted Passenger Biomechanical Gray Zone

Head G's controls the low end of the biomechanical gray zone, while within the speed range evaluated nothing controlled the high end of the biomechanical gray zone. The IARV goals are met at all speeds assessed.

Unbelted Passenger Biomechanical Gray Zone

The low end of the biomechanical gray zone is set by the lowest impact velocity evaluated, not the cross-over of the low and high-level inflator output occupant performance curves. Further study may be desired below the given velocity range. Head G's IARV goal control the high end of the biomechanical gray zone. For the unbelted passenger the head G's exceed the IARV goals below the maximum velocity assessed.

Figure 15:
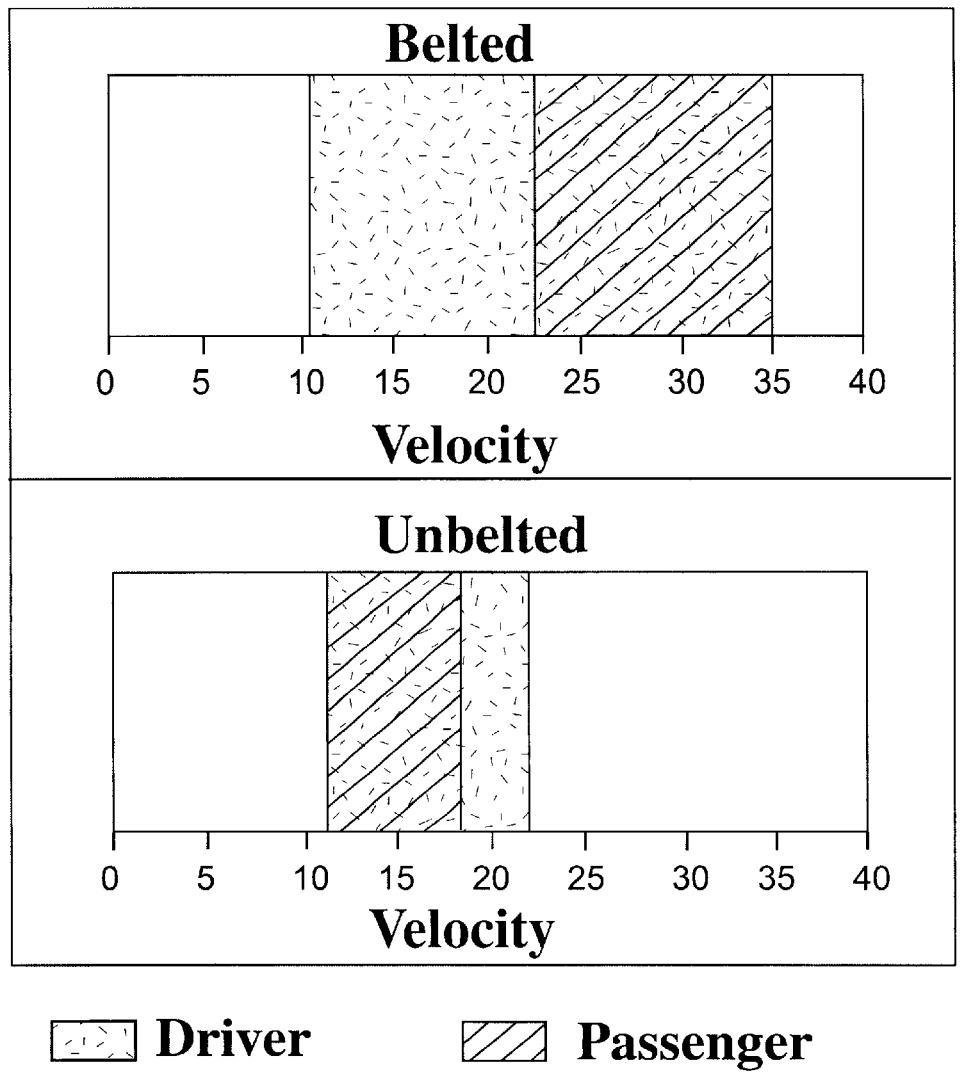
FIG. 15 shows the overlap of the driver and passenger and biomechanical gray zones.

Separate biomechanical gray zones can be calculated for both driver and passenger occupants. When they are combined an overall composite picture can be created for occupant performance. FIG. 15 shows the relationship of the biomechanical gray zone as a function of impact velocity. The region where the driver and passenger overlap defines the composite biomechanical gray zone, assuming common driver and passenger thresholds are used.

Figure 16:
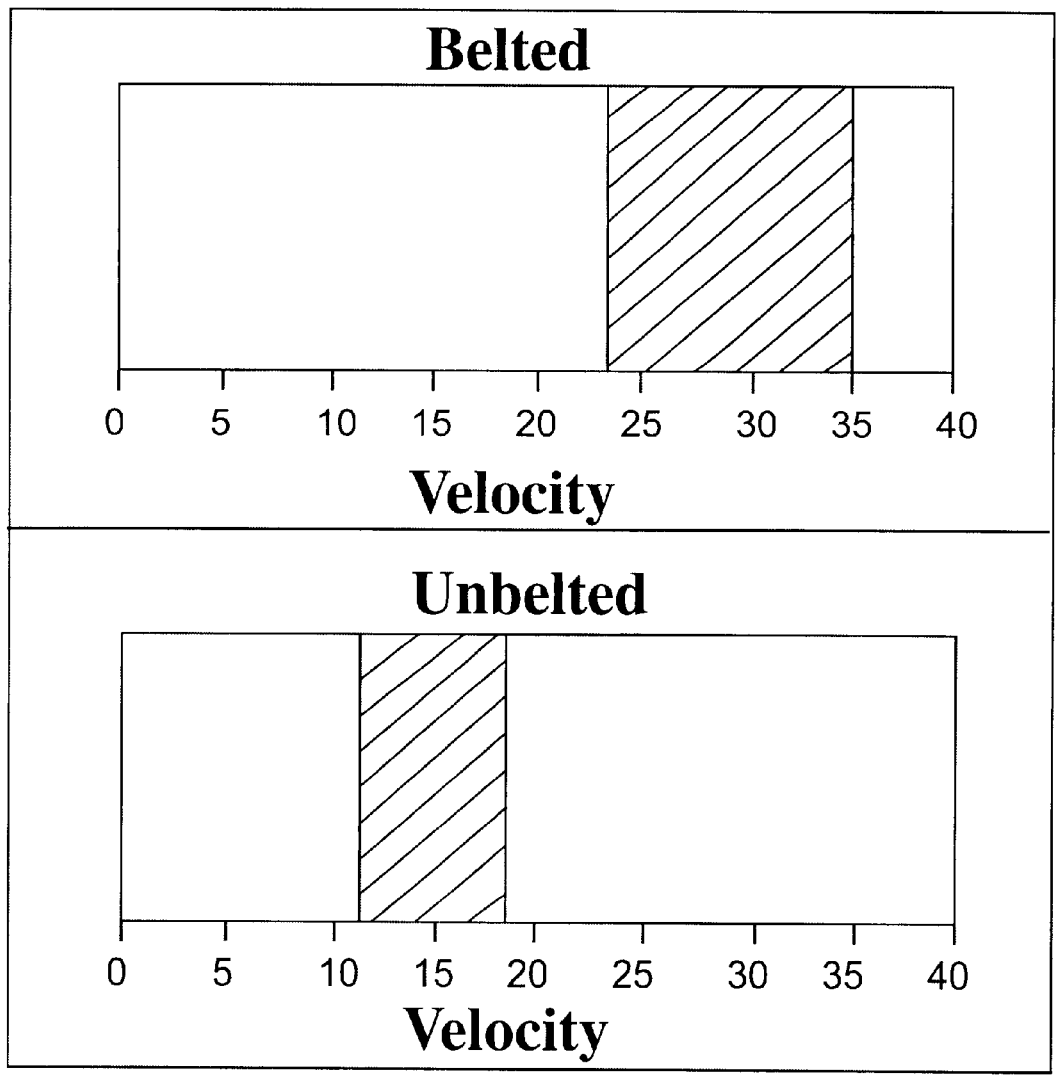
FIG. 16 shows a composite driver and passenger biomechanical gray.

FIG. 16 represents the composite (common driver and passenger thresholds) biomechanical gray zones for each restraint condition. The figure defines the velocity ranges where acceptable biomechanical performance is produced with high or low output inflators. The biomechanical gray zones can be overlaid with the sensing gray zones produced by the crash algorithm. Ideally the sensing gray zones should fall inside the biomechanical gray zones. The figure is useful in identifying discrepancies between the sensor and restraint system performance, and is crucial in obtaining a balanced restraint system design.

The belted driver biomechanical gray zones span the entire velocity range evaluated. Within the speed ranges evaluated, the belted driver meets all IARV goals for low or high-level inflator output. The unbelted driver low-end biomechanical gray zones were set by the lowest impact velocity evaluated. The unbelted driver high-end biomechanical gray zone is controlled by head G's. This appears to be caused by the head-to-windscreen contact.

The unbelted driver exceeds the head G's goal at a velocity below the maximum speed assessed. The belted passenger low-end biomechanical gray zone is controlled by head G's, while the high end was not controlled by any occupant performance measurement and was based on the highest impact velocity evaluated.

The unbelted passenger low-end biomechanical gray zones were set by the lowest impact velocity evaluated. The unbelted passenger high-end biomechanical gray zone is controlled by head G's. The unbelted passenger exceeds the head G's IARV goal at a velocity below the maximum speed assessed.

Many changes and modifications in the above-described embodiment of the invention can, of course, be carried out without departing from the scope thereof. Accordingly, that scope is intended to be limited only by the scope of the appended claims.

What is claimed is:

1. An occupant restraint system for restraining a vehicle's occupant during a vehicle crash event in a fashion where the occupant is restrained such that the occupant does not receive crash induced forces which exceed a set of injury criteria, the restraint system comprising:

a deployable restraint having a first state configured to impart a first restraining energy upon the occupant and a second state configured to impart a second restraining energy upon the occupant;

a sensor configured to produce a signal indicative of the crash deceleration during the crash event;

a controller configured to receive the signal and send a control signal to the deployable restraint, the controller having a lower must-fire threshold indicative of a minimum change in velocity at which the first state is initiated and a higher must-fire threshold where the second state should be initiated, the controller having a sensing gray zone between the lower must-fire threshold and the higher must-fire threshold, the sensing gray zone being a region where the controller is unable to determine whether to initiate the first state or the second state, the controller further having a biomechanical gray zone defined between the lower must-fire threshold and the higher must-fire threshold, the biomechanical gray zone having a first lower threshold indicative of the highest speed where the first state produces more desirable in-position occupant performance values than no initiation of the restraint, but does not exceed out-of-position occupant performance standards; and wherein the higher must-fire threshold is the lowest speed where occupant performance with the first state exceeds the injury criteria.

2. The occupant restraint system according to claim 1 wherein the biomechanical gray zone is defined between the first must-fire threshold and a second must-fire threshold.

3. The occupant restraint system according to claim 1 wherein the out-of-position occupant performance values are a percentage of out-of-position injury assessment reference value goals for out of position occupants.

4. The occupant restraint system according to claim 1 wherein the in-position occupant performance values are normalized at 100% of the Federal Motor Vehicle Safety Standards 208 values.

5. The occupant restraint system according to claim 1 wherein the in-position occupant performance values are less than the Federal Motor Vehicle Safety Standards 208 values.

6. The occupant restraint system according to claim 5 wherein the in-position occupant performance values are between about 60% and 90% of the Federal Motor Vehicle Standards 208 values.

7. The occupant restraint system according to claim 6 wherein the higher must-fire threshold is the lowest speed where occupant performance with the first state exceeds the desirable in-position occupant performance values.

8. The occupant restraint system according to claim 6 comprising a second sensor configured to provide a second signal indicative of whether an occupant's seat belt is properly engaged.

9. The occupant restraint system according to claim 8 comprising a second lower must-fire threshold indicative of a minimum change in velocity at which the first state is initiated when the occupant is belted and a second higher must-fire threshold where the second state should be initiated when the occupant is belted.

10. The occupant restraint system according to claim 8 comprising a second biomechanical gray zone where the controller is unable to determine whether to initiate the first state or the second state when the occupant is belted.

11. The occupant restraint system according to claim 10 wherein the second biomechanical gray zone has a lower threshold indicative of the highest speed where the first state produces more desirable in-position occupant performance values than no initiation of the restraint when the occupant is belted.

12. The occupant restraint system according to claim 11 wherein the second biomechanical gray zone lower threshold is indicative of the highest speed where the first state does not exceed out-of-position occupant standards for a belted occupant.

13. The system according to claim 10 wherein the in-position occupant performance values are normalized to 100% of the Federal Motor Vehicle Safety Standards 208 values.

14. The system according to claim 1 wherein the in-position occupant performance values are between about 60% and about 40% of the Federal Motor Vehicle Safety Standards 208 values.

15. The system according to claim 1 wherein the second restraining energy is greater than the first restraining energy.

16. The system according to claim 2 further comprising a second deployable restraint configured to receive the control signal.

17. The system according to claim 1 wherein the controller is configured to send a second control signal upon determining the crash event is above the higher must-fire threshold; and, the deployable restraint is configured to initiate the second state upon receiving the second control signal.

18. The system according to claim 17 further comprising a second deployable restraint, having a second deployable restraint first state and a second deployable restraint second state, said second deployable restraint being configured to initiate the second deployable restraint first state upon receipt of the control signal and initiate the second deployable restraint second state upon receipt of the second control signal.

* * * * *